United States Patent Office 3,376,320
Patented Apr. 2, 1968

3,376,320
ANTHRAQUINONE DYESTUFFS
Hans Rudolf Schwander and Jean-Pierre Jung, Riehen, and Peter Hindermann, Bottmingen, Basel-Land, Switzerland, assignors to J. R. Geigy A.G., Basel, Switzerland
No Drawing. Continuation-in-part of applications Ser. No. 261,864 and Ser. No. 261,865, Feb. 28, 1963. This application June 7, 1965, Ser. No. 462,073
Claims priority, application Switzerland, Apr. 23, 1958, 58,664
4 Claims. (Cl. 260—372)

This application is a continuation-in-part of our patent application Ser. No. 806,998, filed on Apr. 17, 1959, now abandoned, and of our pending patent applications 261,864 and 261,865, filed Feb. 28, 1963, as continuations of said first-named application (and abandoned since the filing of the present application).

The present invention concerns new dyestuffs which are especially valuable in particular for textile dyeing and printing as dyeings and prints which have excellent fastness to washing can be produced therewith. It also concerns processes for the production of such dyestuffs.

It has now been found that aminoanthroquinone dyestuffs of the most different types can be converted into more valuble new dyestuffs by the introduction of halogen acylamino methyl groups. The reaction products according to the invention are 1-aminoanthraquinone dyes which are substituted in 2-position by $SO_3H$ and in 4-position by a phenylamino radical having the grouping —$CH_2$—NH—CO—Y linked to the benzene nucleus of said substituent. Y in this grouping represents a lower haloalkyl radical wherein halo is a halogen atom of the atomic weight of at least 35 and at most 80. The benzene nucleus of the above-mentioned substituent in 4-position is further substituted by from one to three lower alkyl radicals each alkyl having from 1 to 4 carbon atoms.

The production of the said dyestuffs is carried out by reacting an aminoanthraquinone dyestuff which contains at least one aromatic radical having a replaceable hydrogen atom bound to the anthraquinone nucleus by a hetero atom, with the N-methylol compound of a low molecular α- or β-halogen fatty acid amide or with a functional derivative thereof which reacts in the same way as this methylol compound, the reaction being performed under such conditions that at least one halogen fatty acid amido methyl group is introduced. If necessary, the reaction product is then sulfonated and/or afterhalogenated.

The carbacylamino methyl groups which are characteristic of the new dyestuffs according to the invention, and of which generally one or two are present, contain a mobile halogen atom in the acyl radical, i.e. one which is easily split off in an alkaline medium by accepting the pair of electrons in the bond. The halogen atoms is preferably bound in the α-position to the carbonyl group, and the acyl radical itself should have not more than four carbon atoms. Chiefly chlorine and bromine are used as halogens. The chloroacetylaminoethyl group is preferred, but also the bromacetylaminomethyl group and the chloropropionylaminomethyl group, the bromopropionylaminoethyl group as well as the α,β-dichloropropionylaminomethyl group are useful as fiber-reactive groups in the compounds according to the invention. In these groups, Y thus represents —$CH_2Cl$, —$CH_2Br$,

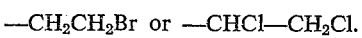

—$CH_2CH_2Br$ or —CHCl—$CH_2Cl$.

The introduction of these halogen fatty acid amido methyl groups into the organic dyestuffs is achieved by the reaction with N-methylol compounds or α- and β-halogen fatty acid amides under appropriate conditions, as e.g., they were made known by A. Einhorn (A.) 343, 207 (1905) and ibid 361, 113 (1908). This author and others have described the products of condensation from halogen fatty acid-N-methylol amides with colorless aromatic compounds of the benzene and naphthalene series. It has now been found that also colored organic compounds, in fact aminoanthraquinone dyestuffs, enter into an Einhorn reaction. This is conditional upon these dyestuffs containing at least one hydrogen atom replaceable in the conditions in which the reaction takes place. It is preferable that the replaceable hydrogen atom should be on an aromatic ring system.

In the process according to the invention, the anthraquinone moiety of the dyestuff can be, for example, the radical of α,α'-diaminoanthraquinone derivative which contains a monovalent radical usable in the Einhorn reaction, advantageously a mononuclear aromatic radical of the benzene series, at at least one of the two amino groups. This mononuclear radical is, for example, an aromatic radical such as, for example, the phenyl and alkylphenyl radicals.

As defined, the new dyestuffs contain at least one sulfonic acid group per dyestuff molecule. One of these sulfonic acid groups can already be present in the dyestuffs used as reaction partner such as, e.g. in the 1,4-diaminoanthraquinone-2-sulfonic acid derivatives. They can often be introduced by sulfonation in a conventional manner before or after the Einhorn reaction. In this case the reaction is so performed that advantageously 1 to 2 sulfonic acid groups are introduced.

Dyestuffs containing halogen, advantageously bromine, can also be produced by halogenating the condensation products.

The halogen fatty acid N-methylol amides, which according to the process employed in the invention enter into consideration as second reaction component, are obtained by the addition of formaldehyde to α- or β-halogen fatty acid amides with the assistance of basic condensing agents such as potassium carbonate, or else by the action of mineral acid under mild reaction conditions. In the process under review it is above all the N-methylol compounds of monochloracetamide, monobromacetamide, α-bromo-propionic acid amide, β-chloro- and β-bromopropionic acid amide as well as of α,β-dichloropropionic acid amide which are of importance. N-methylol chloracetamide is the reactant to be preferred, both in consideration of its easy accessability and with regard to the good quality as dyes of the end products obtained by its use.

The condensation of the dyestuffs with the methylol compounds takes place in the presence of acid condensing agents or agents splitting off water which react in the same way. Among these, concentrated hydrochloric acid, zinc chloride, phosphorus pentoxide, acetic acid anhydride, syrupy phosphoric acid and fuming sulfuric acid are particularly applicable. The condensing agent to be preferred, however, is sulfuric acid concentrated until anhydrous, as normally it can be used at the same time as a solvent for the reactants. The temperature at which the reaction takes place may vary within a wide range and depends above all on the condensing agent used. In concentrated sulfuric acid, the reaction will normally proceed quickly and completely even at room temperature. In some cases it is necessary to work at higher temperature, e.g. from 40–80° C., particularly when several carbon amido-methyl groups are to be introduced. It must be predicated however, that the reactants in these conditions are not broken down, and that if necessary the occurrence of sulfonation of the product of the reaction is admissible. The final products of the reaction are separated by pouring the solutions or suspensions in sulfuric acid into ice-water, and isolated in the usual manner.

In place of the halogen fatty acid-N-methylol amides, reactive functional derivatives of these methylol compounds may be used, insofar as they react analogously. For example, the esters obtained by treating the methylol compounds with inorganic or organic acids or acid halides or anhydrides come under this heading, as do the di-(fatty acid amido-methyl) ethers obtained by self-condensation in the presence of, e.g., phosphorus oxychloride. As however, these functional derivatives must be prepared from the methylol compounds, the method mentioned first is ordinarily preferred. Nevertheless, in individual cases in which the Einhorn-like process does not lead to satisfactory results, it is possible to achieve the desired end by means of these derivatives, above all with the N-chloromethyl amides. In some cases it is possible to simplify the process according to the invention by utilizing for the reaction in one step a mixture of the dyestuff with formaldehyde and the halogen fatty acid amide, instead of proceeding from the prepared methylol derivatives of the amides.

The dyestuffs according to the invention are suitable for the dyeing of fibers which contain nitrogen such as leather, silk, superpolyamide and superurethane fibers and above all, wool. They draw from an aqueous acid solution very evenly onto these fibers. Many of these dyestuffs already possess in a weak acid or neutral bath a high degree of affinity for these nitrogenous materials, and therefore, very good powers of penetration. The dyeings thus attained, particularly in the case of wool, are characterized by uniformity and very fast quality to washing and milling, above all in the alkaline range. These dyeings are, in addition, often very fast to light.

Particularly favoured because of their interesting shades and their very good fastness are the acid anthraquinone dyestuffs, according to the invention, containing bound in the 4-position an arylamino group and in the aryl radical thereof the halogen fatty acid amido-metal group, in the 1-position an unsubstituted amino group and in the 2-position a sulfonic acid group. The arylamino group in particular is a methyl-anilino group.

More in detail, the invention concerns the anthraquinone dyestuffs of the formula.

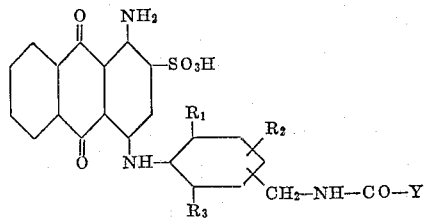

wherein each of $R_1$ and $R_2$ represents a member, independently of each other consisting of hydrogen or lower alkyl, and $R_3$ represents lower alkyl, preferably from of 1 to 2 carbon atoms, which dyestuffs dye wool and man-made polyamide fibers in blue shades which are fast to washing, especially to water, and to alkaline milling.

"Lower" when used in this specification and the appended claims in connection with an aliphatic radical means that such radical has from 1 to 4, and preferably from 1 to 2, carbon atoms, unless expressly stated otherwise.

More detailed particulars of the production and use of the new dyestuffs are made clear from the following examples. These serve merely to illustrate the invention and, therefore, in no way limit it. The parts in these examples are parts by weight, unless expressly stated otherwise, and the temperatures given throughout the specification are in degrees centigrade. The relationship of parts by weight to parts by volume is as that of grams to milliliters.

Example 1

17.76 parts of the sodium salt of the dyestuff of the formula

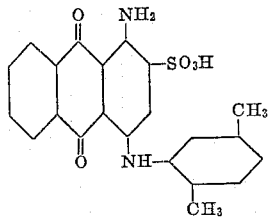

obtained by condensation of 1 mol of 1-amino-4-bromanthraquinone-2-sulphonic acid with 1 mol of 2,5-dimethyl aniline, are dissolved at 10–15° in 180 parts of 96% sulphuric acid. 5.46 parts of N-methylol chloracetamide are added to this solution and the whole is stirred for 24 hours at the same temperature. The mixture is then poured onto ice and the precipitated dyestuff is filtered off under suction. It is pasted in water, the suspension obtained is carefully brought to a pH of 7 with caustic soda lye and then the dyestuff is precipitated in the form of the sodium salt with sodium chloride. The dried dyestuff is a dark blue powder which dyes wool from a weakly acid bath in blue shades. The wool dyeings have good wet fastness properties.

Example 2

26.7 parts of the sodium salt of the dyestuff of the formula

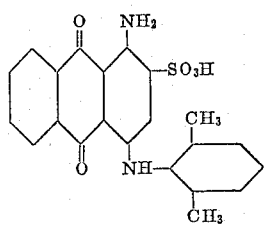

obtained by condensation of 1 mol of 1-amino-4-bromanthraquinone-2-sulphonic acid with 1 mol of 2,6-dimethyl aniline are dissolved at 15–20° in 560 parts of 96% sulphuric acid. 8.2 parts of N-methylol chloracetamide are added to this solution and the mixture is stirred for 24 hours at 15–20°. It is then poured onto ice, the precipitated dyestuff is filtered off under suction, pasted in water, the pH of the suspension is carefully brought to 7 with caustic soda lye and then the dyestuff is salted out in the form of the sodium salt. The dyestuff is filtered off under suction and dried. It is a dark blue powder. It dyes wool from a weakly acid bath in reddish-blue shades. The wool dyeings have very good wet fastness properties.

A dyestuff containing bromine having similar properties is obtained if 15 parts of the above dyestuff are dissolved at 20–25° in 90 parts of monohydrate and 4.33 parts of bromine are added to the solution. The mixture is stirred for 24 hours at 20–25°, whereupon the dyestuff is precipitated by pouring onto ice and converted into the sodium salt in the manner described above. The afterbrominated dyestuff dyes wool in more red shades. The dyeings have good all round fastness properties.

If, in the condensation in sulphuric acid, 28.32 parts of the sodium salt of the dyestuff obtained by condensing 1 mol of 1-amino-4-bromanthraquinone-2-sulphonic acid with 1 mol of 2.6-diethyl aniline, are used, then a dyestuff is obtained by the procedure described above which dyes wool from a weakly acid bath also a fast blue shade.

In addition, if 27.5 parts of the sodium salt of the dyestuff obtained by condensing 1 mol of 1-amino-4-bromanthraquinone-2-sulphonic acid with 1 mol of 2-methyl-6-ethyl aniline, are used, then a dyestuff is obtained which also dyes wool from a weakly acid bath a fast blue shade.

Example 3

17.76 parts of the sodium salt of the dyestuff of the formula

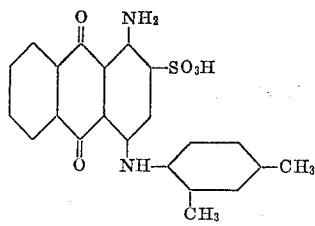

obtained by condensation of 1 mol of 1-amino-4-brom-anthraquinone-2-sulphonic acid with 1 mol of 1-amino-2,4-dimethyl benzene, are dissolved at 10–15° in 320 parts of 96% sulphuric acid, 5.46 parts of N-methylol chloracetamide are added to this solution and the whole is stirred for 24 hours at the same temperature. The mixture is then poured onto ice and the sodium salt of the dyestuff is precipitated as described in Example 1. The dyestuff so obtained dyes wool from a weakly acid bath a blue shade. The dyeing has very good fastness properties.

If, in the above process under otherwise the same conditions, 17.2 parts of the sodium salt of the dyestuff obtained by condensing 1 mol of 1-amino-4-bromanthraquinone-2-sulphonic acid with 1 mol of o-toluidine, are used, then a dyestuff is obtained which also dyes wool fast blue.

In addition, if instead of N-methylol chloroacetamide, 6.1 parts of N-methylol-β-chloropropionic acid amide (M.P. 78°) are used (obtained by alkaline condensation of β-chloropropionic acid amide with formaldehyde), or if 7.4 parts of N-methylol bromacetamide are used, then dyestuffs having similar properties are obtained.

Example 4

6.64 parts of the dyestuff obtained according to Example 3 are dissolved at 10–15° in 75 parts of 96% sulphuric acid. The solution is cooled to 8–10° in 1.94 parts of bromine are added and the whole is stirred for 24 hours at the same temperature. The mixture is then poured onto ice and the dyestuff is converted into the sodium salt. The strong reddish-blue dyeings on wool obtained with this dyestuff have good fastness properties.

Example 5

27.6 parts of the sodium salt of the dyestuff of the formula

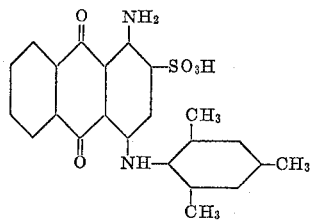

obtained by condensation of 1 mol of 1-amino-4-brom-anthraquinone-2-sulphonic acid with 1 mol of 2,4,6-trimethyl aniline, are dissolved at 15–20° in 560 parts of 96% sulphuric acid. 8.2 parts of N-methylol chloracetamide are added to this solution. The mixture is stirred for 24 hours at 15–20° whereupon it is poured onto ice and the dyestuff, in the form of the sodium salt, is precipitated as described in Example 1. Valuable reddish-blue wool dyeings are obtained therewith which are very fast to milling, sea water and light.

If, in the above process, 28.3 parts of the dyestuff obtained by condensing 1 mol of 1-amino-4-bromanthraquinone-2-sulphonic acid with 1 mol of 2,4-dimethyl-6-ethyl aniline, or if 30 parts of the solution of the dyestuff obtained by condensing 1 mol of 1-amino-4-bromanthraquinone-2-sulphonic acid with 1 mol of 2,4,6-triethyl aniline, or if 28.32 parts of the sodium salt of the dyestuff obtained by condensing 1 mol of 1-amino-4-brom-anthraquinone-2-sulphonic acid with 1 mol of 2,3,5,6-tetramethyl aniline are used under otherwise the same conditions, then dyestuffs which also dye wool in fast blue shades are obtained.

Example 6

17.2 parts of the sodium salt of the dyestuff of the formula

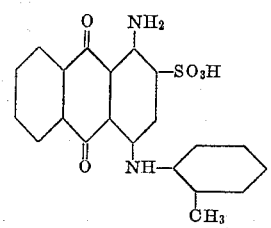

obtained by condensation of 1 mol of 1-amino-4-brom-anthraquinone-2-sulphuonic acid with 1 mol of o-toluidine are dissolved at 10–15° in 170 parts of 96% sulphuric acid. 8.1 parts of N-methylol-bromacetamide are added to this solution and the whole is stirred for 24 hours at the same temperature. The mixture is then poured onto ice and the precipitated dyestuff is converted into its sodium salt in the usual way. The sodium salt is a dark powder which dissolves in sulphuric acid with a blue colour. Wool dyeings obtained with this dyestuff from a weakly acid bath have good fastness properties.

If in this example, under otherwise the same conditions, 5.75 parts of N-methylol-β-chloropropionic acid amide are used, then a dyestuff having similar properties is obtained.

Also, if 7.2 parts of N-methylol-α,β-dichloropropionic acid amide are used, then a dyestuff which also produces fast blue dyeings on wool is obtained.

In addition, on using 7.64 parts of N-methylol-β-bromopropionic acid amide, then a dyestuff with similar properties is obtained.

Example 7

100 parts of wool flannel are entered into a dyebath which contains 1 part of the dyestuff according to Example 5 and 3 parts of ammonium sulfate or 5 parts of ammonium acetate and 10 parts of Glauber's salt in 3000 parts of water. The temperature on entering the goods is 40 to 45° and within half an hour it is gradually brought to the boil and kept at the light boil for half an hour. The very level reddish-blue wool dyeing obtained has very good fastness to milling, sea water and light.

We claim:

1. A blue-dyeing anthraquinone dyestuff, for polyamide fiber materials, of the formula

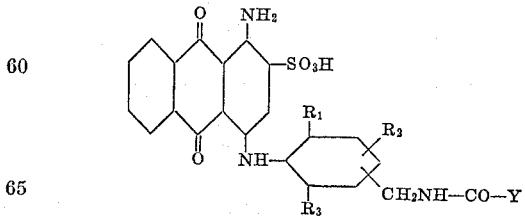

wherein
each of $R_1$ and $R_2$ represents, individually, hydrogen or lower alkyl,
$R_3$ represents lower alkyl, and
Y represents —$CH_2Cl$, —$CH_2Br$, —$CH_2CH_2Cl$,
—$CH_2CH_2Br$
or $CHCl$—$CH_2Cl$.

2. The blue anthraquinone dyestuff of the formula

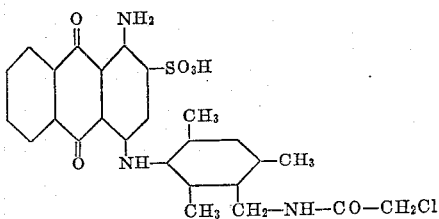

3. The blue-dyeing anthraquinone dyestuff for polyamide fiber materials of the formula

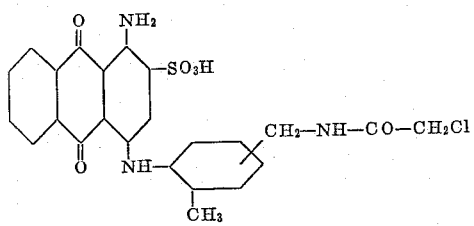

characterized by fastness to washing and to alkaline milling.

4. The blue anthraquinone dyestuff for polyamide fiber materials of the formula

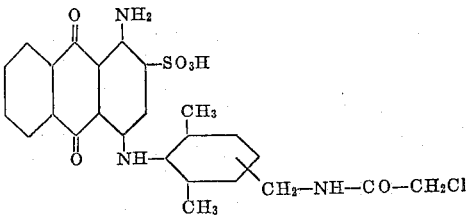

characterized by fastness to washing and to alkaline milling.

References Cited

UNITED STATES PATENTS

| | | | |
|---|---|---|---|
| 2,029,007 | 1/1936 | Weinand | 260—374 |
| 2,419,405 | 4/1947 | Klein | 260—380 |
| 2,659,737 | 11/1953 | Peter et al. | 260—374 |
| 2,740,796 | 4/1956 | Singer et al. | 260—372 |
| 2,870,173 | 1/1959 | Hindermann et al. | 260—374 |

LORRAINE A. WEINBERGER, *Primary Examiner.*

H. C. WEGNER, *Assistant Examiner.*